(12) United States Patent
Wang et al.

(10) Patent No.: US 7,573,896 B2
(45) Date of Patent: Aug. 11, 2009

(54) METHOD AND APPARATUS FOR GENERIC INTERFACE, PACKET CUT-THROUGH, OVERBOOKING, QUEUE CONCATENATION, AND LOGICAL IDENTIFICATION PRIORITY FOR A SYSTEM PACKET INTERFACE DEVICE

(75) Inventors: Sibing Wang, Shanghai (CN); Xiaoqian Zhang, Shanghai (CN); Zhonghai Gan, Shanghai (CN); Shubing Zhai, Shanghai (CN)

(73) Assignee: Integrated Device Technology, Inc., San Jose, CA (US)

( * ) Notice: Subject to any disclaimer, the term of this patent is extended or adjusted under 35 U.S.C. 154(b) by 664 days.

(21) Appl. No.: 11/250,873

(22) Filed: Oct. 14, 2005

(65) Prior Publication Data

US 2006/0083185 A1   Apr. 20, 2006

Related U.S. Application Data

(60) Provisional application No. 60/619,234, filed on Oct. 15, 2004.

(51) Int. Cl.
*H04L 12/28* (2006.01)

(52) U.S. Cl. .................................... 370/419; 370/391
(58) Field of Classification Search ............... None
See application file for complete search history.

(56) References Cited

U.S. PATENT DOCUMENTS

| 6,118,783 | A  * | 9/2000  | Kunito ........................ 370/399 |
| 6,954,466 | B1   | 10/2005 | Dalleggio et al. |
| 2003/0117958 | A1 | 6/2003 | Nation et al. |
| 2004/0109473 | A1 * | 6/2004 | Lebizay et al. ............... 370/466 |
| 2004/0156325 | A1 * | 8/2004 | Perkins et al. ............... 370/299 |
| 2004/0252684 | A1 | 12/2004 | Evans et al. |
| 2005/0240745 | A1 * | 10/2005 | Iyer et al. ..................... 711/167 |
| 2006/0039284 | A1 * | 2/2006 | Zhai et al. .................... 370/235 |
| 2006/0159019 | A1 * | 7/2006 | Buskirk et al. ............... 370/235 |
| 2007/0127382 | A1 * | 6/2007 | Hussain et al. ............... 370/235 |
| 2008/0291832 | A1 * | 11/2008 | Bordogna et al. ........... 370/236 |

* cited by examiner

*Primary Examiner*—Phirin Sam
(74) *Attorney, Agent, or Firm*—Heimlich Law; Alan Helmlich, Esq.

(57) ABSTRACT

A method and apparatus for generic interface, packet cut-through, overbooking, queue concatenation, and logical identification priority for a System Packet Interface device have been disclosed.

2 Claims, 18 Drawing Sheets

| SOP/SOT | DM | DM | DM | DM |
|---|---|---|---|---|
| | LID | DM | DM | DM |
| EOP/EOT | B3/DM | B2/DM | B1/DM | B0 |
| | B7/DM | B6/DM | B5/DM | B4/DM |

Short transfer with 1~8 bytes  1002

| SOP/SOT | DM | DM | DM | DM |
|---|---|---|---|---|
| | LID | DM | DM | DM |
| Normal Data | | | | |
| EOP/EOT | B11/DM | B10/DM | B9/DM | B8 |
| | B15/DM | B14/DM | B13/DM | B12/DM |

Normal transfer  1004

FIG. 10

METHOD AND APPARATUS FOR GENERIC INTERFACE, PACKET CUT-THROUGH, OVERBOOKING, QUEUE CONCATENATION, AND LOGICAL IDENTIFICATION PRIORITY FOR A SYSTEM PACKET INTERFACE DEVICE

RELATED APPLICATION

This patent application claims priority of U.S. Provisional Application Ser. No. 60/619,234 filed Oct. 15, 2004 titled "Method and Apparatus for generic interface, packet cut-through, overbooking, queue concatenation, and logical identification priority for a System Packet Interface device", which is hereby incorporated herein by reference.

FIELD OF THE INVENTION

The present invention pertains to communications. More particularly, the present invention relates to a method and apparatus for a generic interface, packet cut-through, overbooking, queue concatenation, and logical identification priority for a System Packet Interface (SPI) device.

BACKGROUND OF THE INVENTION

Communications is involved with the transfer of data. Data which is in a digital format often needs to be manipulated to achieve effective communication. One interface for data is the System Packet Interface (SPI) which has various levels. For example, SPI Level 4 (SPI4, or SPI-4), is a system packet interface for packet and cell transfer between a physical layer (PHY) device and a Link layer device. SPI-4 is capable of handling aggregate bandwidths of OC-192 ATM and Packet over SONET/SDH (POS), as well as 10 Gb/s Ethernet applications.

As originally defined by the Optical Internetworking Forum (OIF), the SPI interface resides between the PHY device and remaining SONET/SDH system and separates the synchronous PHY layer from the asynchronous packet-based processing performed by the higher layers. SPI-4 was originally conceived to perform at 10 G to support the aggregate bandwidth requirements of ATM and POS applications. SPI-4 has become a ubiquitous standard for multi-protocol communications devices operating at 10 G bandwidth, including Gigabit Ethernet and 10 Gigabit Ethernet PHYs, switch fabric interface circuits (FICs), NPUs, security processors, storage processors, traffic managers, mappers, framers, MACs and PHYs. Thus, SPI is a popular interface, however because of the high bandwidths, difficult interfaces, packet delays, and overflows exist. This presents a problem.

BRIEF DESCRIPTION OF THE DRAWINGS

The invention is illustrated by way of example and not limitation in the figures of the accompanying drawings in which:

FIG. 10 illustrates one embodiment of the invention showing two transfers showing the transfer overhead;

DETAILED DESCRIPTION

Figure 1:
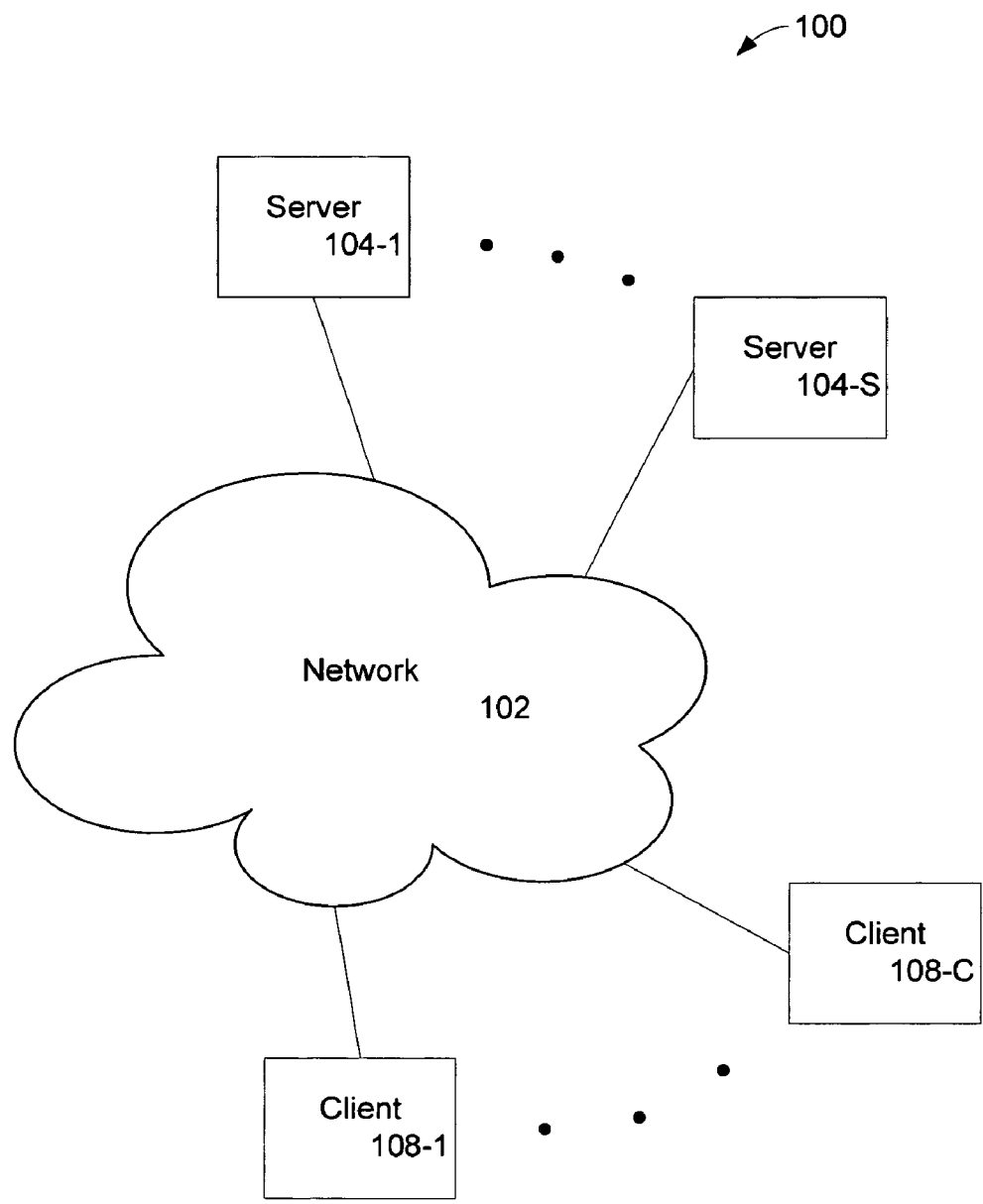
FIG. 1 illustrates a network environment in which the method and apparatus of the invention may be implemented.

The present invention as embodied in one embodiment of a SPI-4 device may be used in a variety of flow control applications for packet processing. These devices are referred to as flow control management (FCM) devices. One such FCM is a packet-exchange device.

A packet-exchange device solves a myriad of interconnect problems in Core/Metro/Edge-based networking markets. For example, in one embodiment an integrated solution supports 10 Gbps packet processing and offers a wide range of options for logical port density and buffering capabilities, ranging from low latency SPI-4-to-SPI-4 switching through complex flow-control designs requiring SPI-4 data overbooking and aggregation.

In one embodiment of the present invention, incorporating three SPI-4 ports, the packet-exchange product facilitates the use of the point-to-point SPI-4 interface in a highly flexible multi-point connection scheme. The embodiment can seamlessly connect multiple SPI-4 network hardware elements such as network processor units (NPUs), co-processors, traffic managers, multi-gigabit framers and physical interfaces (PHYs), and switch fabric interface devices. In one embodiment, the SPI-4 packet-exchange device allows 16 or more logical ports of two SPI-4 interfaces to be combined in a third SPI-4.

In one embodiment of the present invention, it may be used for data switching and aggregation in applications where less than 16 channels, fast backpressure response and adequate buffers in the attached SPI-4 devices are available. In another embodiment of the invention, it may be used for connecting two 24-port 10/100/1000 Ethernet MACs to a single SPI-4 NPU. In another embodiment it may be used where additional buffering and packet processing is needed due to traffic consisting of "jumbo" Ethernet frames. In one embodiment of the invention, it is well suited for connection to devices that have a slow backpressure response due to long internal pipelines tending to create numerous "in-flight" packets.

In one embodiment of the invention, options and flexibility for demanding applications is provided. For example, high logical port counts or large data buffers needed to deal with the more complex data aggregation techniques used in many system architectures is available. This may assist in aiding NPUs as processing elements by helping to regulate end-to-end traffic flow, where the SPI-4 system backpressure creates "bursty" data that can interfere with the correct operation of flow-control mechanisms.

In one embodiment of the invention, a backpressure scheme that tolerates a large range of logical port data rates is possible. In one embodiment the backpressure schemes are accomplished with the aid of large efficient buffers created from segmented memory. This allows faster response times and lower internal latency, while affording absorption of large external delays caused by data and flow control pipelines in adjacent devices such as packet-forwarding engines and PHY devices. The buffering capabilities absorb typical bursts of in-flight packets and prevent loss of information that might occur as a result of long flow-control response times. This backpressure scheme also helps to reduce the frequency of congestion and starvation cycles at points in the data path, resulting in more efficient flow of packet data.

In one embodiment, a SPI-4 packet-exchange device offers a number of features, including the ability to perform an automatic dynamic de-skew of a SPI-4 ingress data channel and SPI-4 egress status channel over a wide frequency range. This feature centers ingress bits and words relative to the clock without intervention by the user.

In one embodiment of the invention, a SPI-4 packet-exchange device offers a high-speed transceiver logic (HSTL) interface to QDR II (QDR2) (quad data rate version 2) memory or HSTL local packet interfacing to an ASIC (application specific integrated circuit) or FPGA (field programmable gate array), thus allowing the expansion of on-chip memory in applications that require additional buffering as well as interfacing to customized logic.

In another embodiment, a suite of diagnostic counters and error simulators, which ease in-service diagnostics and automate system initialization operations are implemented.

In one embodiment of the present invention, a device has three SPI-4 ports, supports 128 logical ports, and has a 128K packet buffer per ingress to egress. In another embodiment of the present invention, a device has three SPI-4 ports, supports 64 logical ports, and has a 64K packet buffer per ingress to egress. In yet another embodiment of the invention, a device has 3 SPI-4 ports, supports 32 logical ports, and has a 32K packet buffer per ingress to egress.

Figure 3:
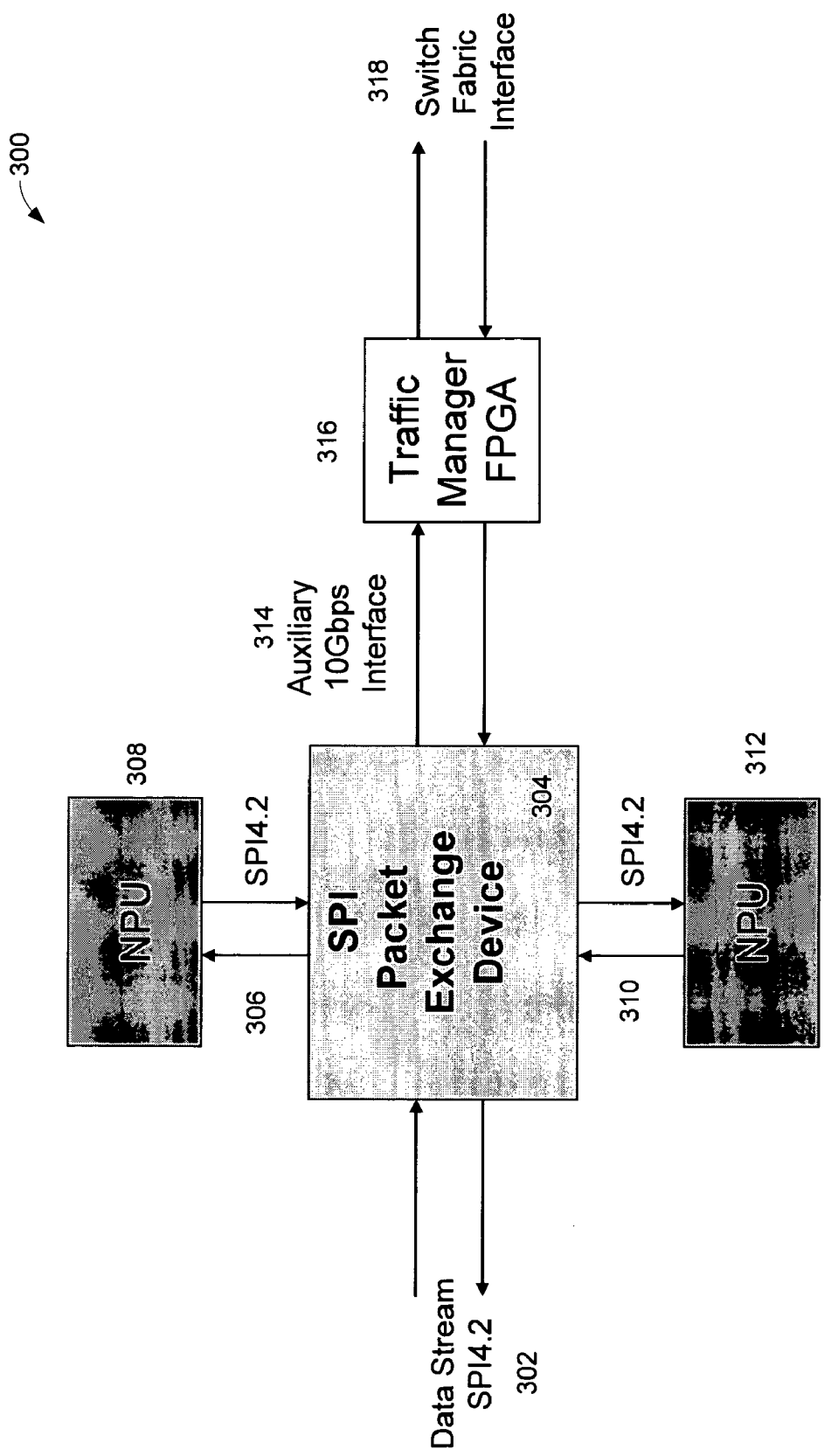
FIG. 3 illustrates one embodiment of the invention where it is used to implement a 10 Gbps full duplex services card.

FIG. 3 illustrates one embodiment of the invention where it is used to implement a 10 Gbps full duplex services card 300. Here SPI packet exchange device 304 has three SPI4.2 data streams: 302, 306 interfacing to a NPU 308, and 310 interfacing to a NPU 312. The auxiliary 10 Gbps interface 314 is going to a traffic manager FPGA 316, which is interfaced to a switch fabric 318.

Figure 4:
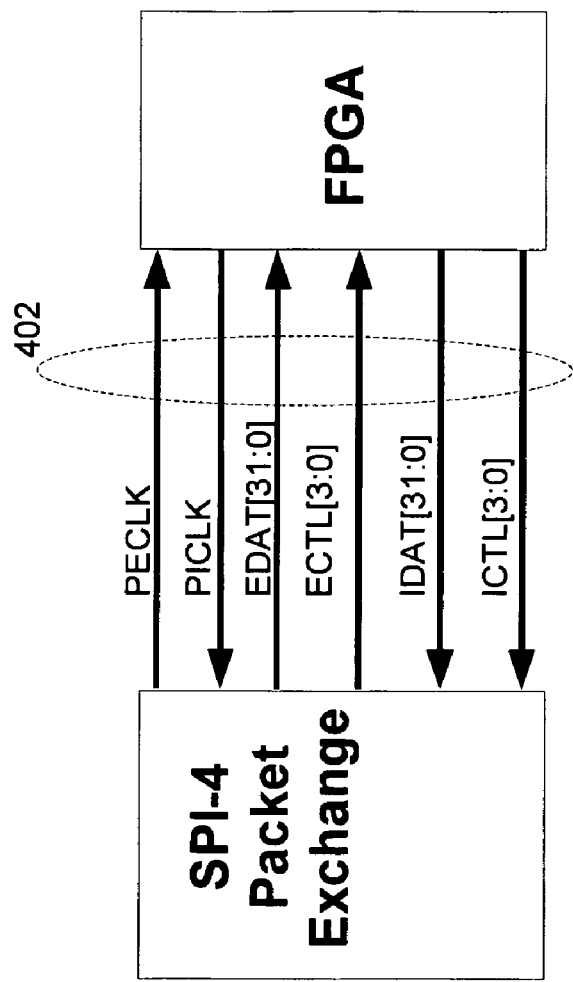
FIG. 4 illustrates one embodiment of the invention showing more details for the auxiliary interface.

FIG. 4 illustrates one embodiment of the invention 400 showing more details for the auxiliary interface. Here a generic 10 Gbps interface 402 showing signals is detailed. The generic 10 Gbps interface 402 is shown interfaced to FPGA, which is loaded with code that bridges to other interfaces such as control plane or switch fabric as needed. The auxiliary interface supports transfer format and flow control. In one embodiment, the code for interfacing to the auxiliary interface is made available for customer FPGA side implementation. In one embodiment the interface supports DDR clock operation up to 200 MHz.

Figure 5:
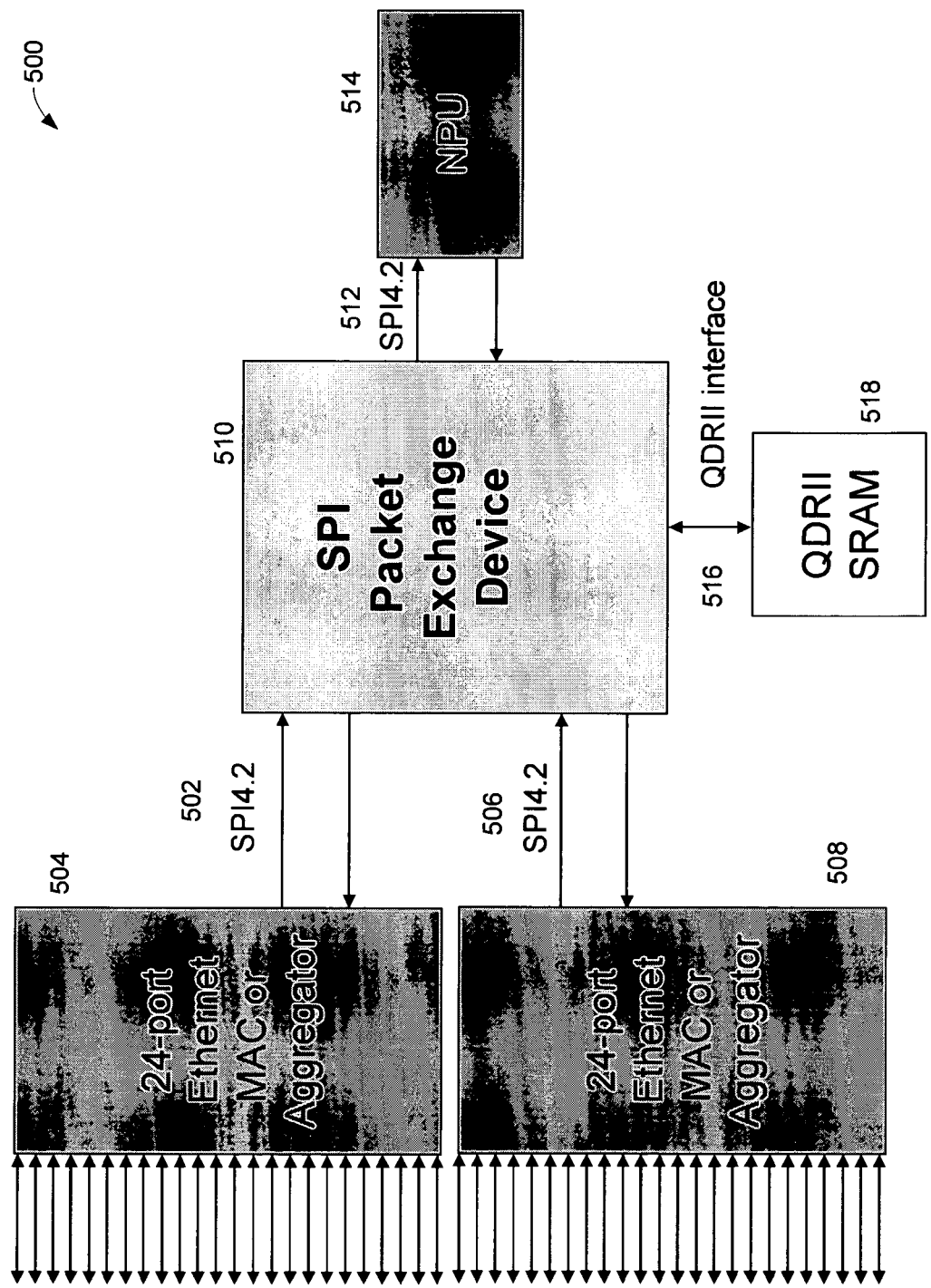
FIG. 5 illustrates one embodiment of the invention where it is used to implement a high density Ethernet line card.

FIG. 5 illustrates one embodiment of the invention where it is used to implement a high density Ethernet line card 500. Here SPI packet exchange device 510 has three SPI4.2 data streams: 502 and 506 interfacing to a 24-port Ethernet MAC or Aggregator 504 and 508 respectively, and 512 interfacing to a NPU 514. The QDRII interface 516 is going to a QDRII SRAM (static random access memory) 518.

Figure 6:
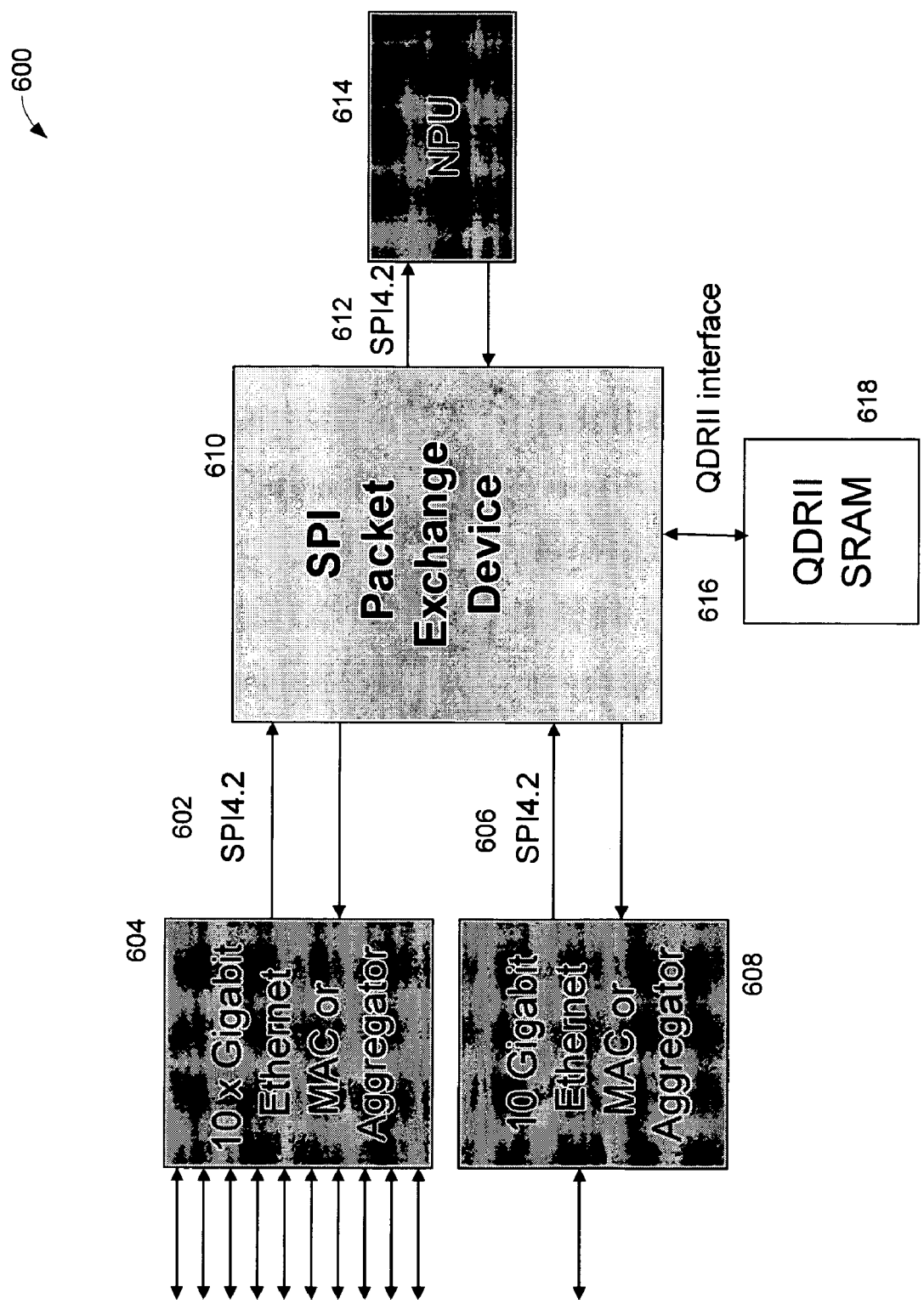
FIG. 6 illustrates one embodiment of the invention where it is used to implement a selectable Ethernet I/O (input/output) option for a NPU.

FIG. 6 illustrates one embodiment of the invention where it is used to implement a selectable Ethernet I/O (input/output) option 600 for a NPU. Here SPI packet exchange device 610 has three SPI4.2 data streams: 602 interfacing to a 10×Gigabit Ethernet MAC or Aggregator 604, 606 interfacing to a 10 Gigabit Ethernet MAC or Aggregator 608, and 612 interfacing to a NPU 614. The QDRII interface 616 is going to a QDRII SRAM (static random access memory) 618.

Figure 7:
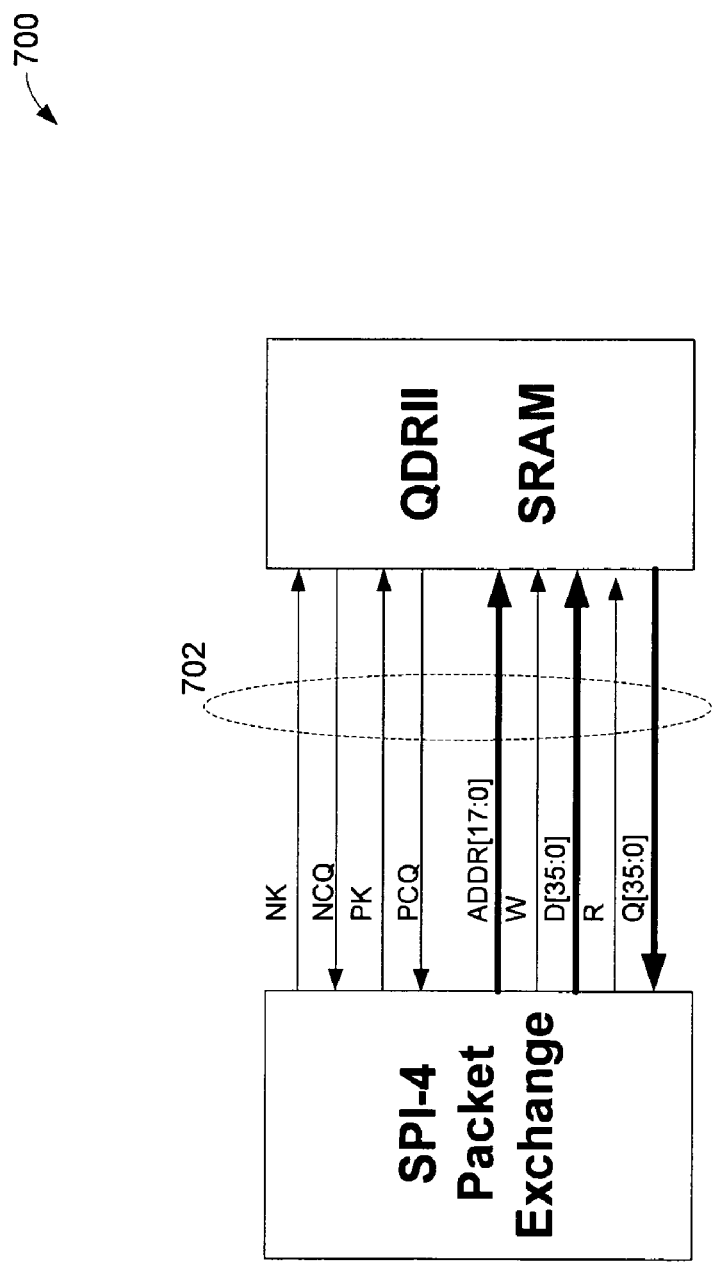
FIG. 7 illustrates one embodiment of the invention showing more details for an auxiliary interface.

FIG. 7 illustrates one embodiment of the invention 700 showing more details for the auxiliary interface. At 702 the signals are detailed. The QDRII interface mode can interface to an 18 Mbit QDRII SRAM with 36 bit data bus. In one embodiment this allows the management of up to 64 independent queues in the QDR-II SRAM, at a full-duplex 10 Gbps interface rate, and with a per queue flow control.

Figure 8:
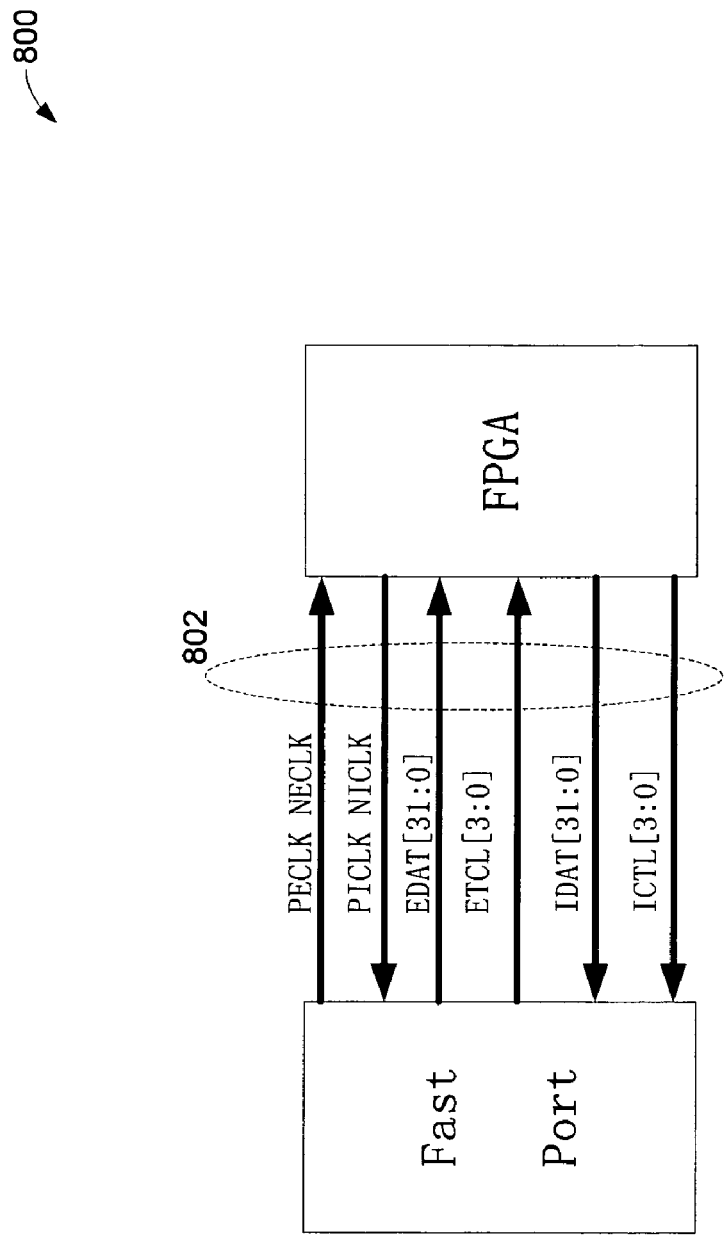
FIG. 8 illustrates one embodiment of the invention showing more details for the generic mode auxiliary interface.

FIG. 8 illustrates one embodiment of the invention 800 showing more details for the generic mode auxiliary interface. At 802 the signals are detailed. The generic interface is designed to connect to a FPGA easily. Ingress and egress may be used as a pair. The ingress flow control message transmits on the egress channel. The egress flow control message transmits on the ingress channel. The flow control mechanism provides both per link level flow control and interface level flow control.

The signal definition is:

| Signal name | I/O | | Description |
|---|---|---|---|
| EDAT[31:0] | O | HSTL | Egress data |
| ECTL[3:0] | O | HTSL | Egress control |
| IDAT[31:0] | I | HSTL | Ingress data |
| ICTL[3:0] | I | HSTL | Ingress control |
| PECLK | O | HSTL | Eclk |
| NECLK | O | HSTL | Eclk |
| PICLK | I | HSTL | Iclk |
| NICLK | I | HSTL | Iclk |
| Vref | I | A | Reference voltage |

Figure 9:
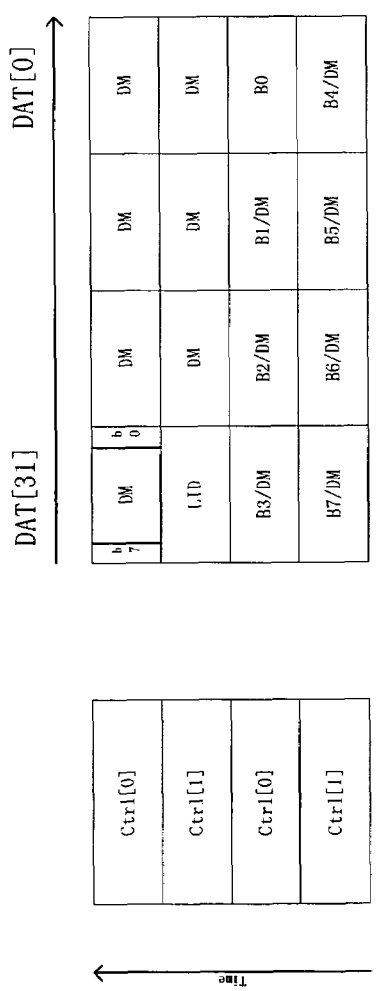
FIG. 9 illustrates one embodiment of the invention showing a transfer formation.

In one embodiment the generic interface transfer format is as follows. A format is defined to map 1-256 bytes in a transfer format. The interface has a 32 bit wide data bus and a 4 bit wide control bus. The 4-bit wide control bus carries the control information, and the 32-bit data bus carries the transfer data. The minimal transfer length is 2 word (1word=1 data cycle). The second word of a transfer carries the LID information. LID[5:0] is mapped into B[5:0] of the first byte. The control field of the first transfer is SOP or SOT. An example of the transfer formation is shown in FIG. 9.

The control field is encoded to indicate the type of data word. In one embodiment the encoding is as follows:

| {ctrl[1], ctrl[0]} | Description |
|---|---|
| 00000000 | EOP 1B without error tag |
| 00000001 | EOP 2B without error tag |
| 00000010 | EOP 3B without error tag |
| 00000011 | EOP 4B without error tag |
| 00000100 | EOP 5B with error tag |

-continued

| {ctrl[1], ctrl[0]} | Description |
| --- | --- |
| 00000101 | EOP 6B without error tag |
| 00000110 | EOP 7B without error tag |
| 00000111 | EOP 8B without error tag |
| 00001000 | EOP 1B with error tag |
| 00001001 | EOP 2B with error tag |
| 00001010 | EOP 3B with error tag |
| 00001011 | EOP 4B with error tag |
| 00001100 | EOP 5B with error tag |
| 00001101 | EOP 6B with error tag |
| 00001110 | EOP 7B with error tag |
| 00001111 | EOP 8B with error tag |
| 00010000 | SOP |
| 00010001 | SOT |
| 00010010 | EOT |
| 00010011 | Normal data, mated receive side ready |
| 00010100 | Normal data, mated receive side full |
| 00010101 | Status word, mated receive side ready |
| 00010110 | Status word, mated receive side full |
| 00010111~11111111 | Reserved |

FIG. 10 illustrates one embodiment of the invention showing two transfers 1000 showing the transfer overhead. At 1002 is a short transfer of 1 to 8 bytes, and at 1004 is a normal transfer.

Figure 11:
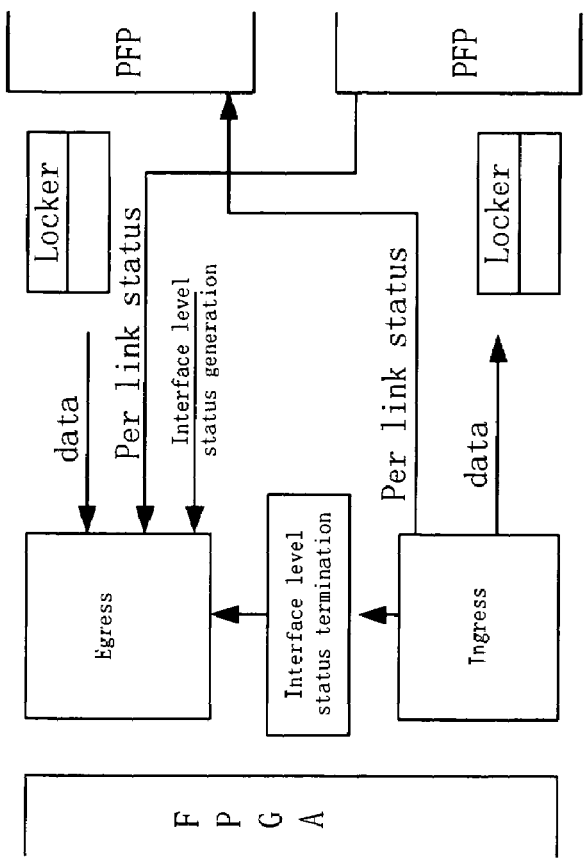
FIG. 11 illustrates one embodiment of the invention interface in block diagram form.

FIG. 11 illustrates one embodiment of the invention interface in block diagram form 1100. In this embodiment the interface operation is as follows. The egress generates the transfer format and local status information. The ingress drops the transfer format and other end status information.

Ingress processing is as follows. Each word of the ingress interface is classified by decoding the control field. The reserved control field is ignored. Extract the LID from the first word of a transfer, the following payload belongs to this LID. Ingress should not send any data until a valid status word is received.

Egress processing is as follows. The egress generates the transfer format. The transfer is dumped to the interface, the link level status word can interrupt the transfer. An example in code is:

```
If(interface level backpressure received) {send status word}
Else{
If (status word request) {
    Send status word}
Else if (there is transfer send) {
    Send transfer}
Else {send status word}
}
```

The status word should be sent in 8 cycles from the request. The received interface level status controls the interface flow. The interface level backpressure should pause the transfer in no more than 8 cycles. When the module is not enabled, it should send status word with interface and per link backpressure (both backpressured).

Figure 12:
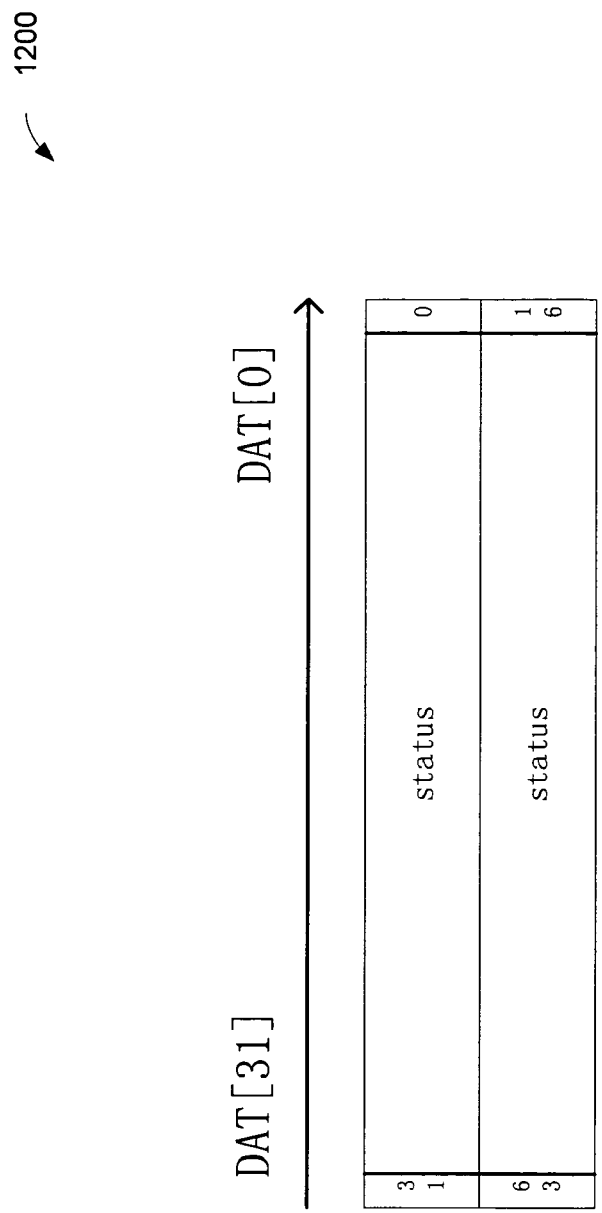
FIG. 12 illustrates one embodiment of the invention showing a per link status word format.

FIG. 12 illustrates one embodiment of the invention showing a per link status word format. The interface level status is carried in the control field as illustrated above. The link level status is carried in the status word.

The interface level status is generated based on the ingress locker. Generate interface level backpressure if 2 or more lockers are full. The link level status from the PFP (packet fragment processor) is monitored. If any used LID (logical identification) status changes, an associated status word and send request is generated. Generates one status word if multiple statuses changed LID encapsulated in the same status word.

Status termination is as follows. Interface level status is sent to egress. The link level status is sent to the PFP.

Figure 13:
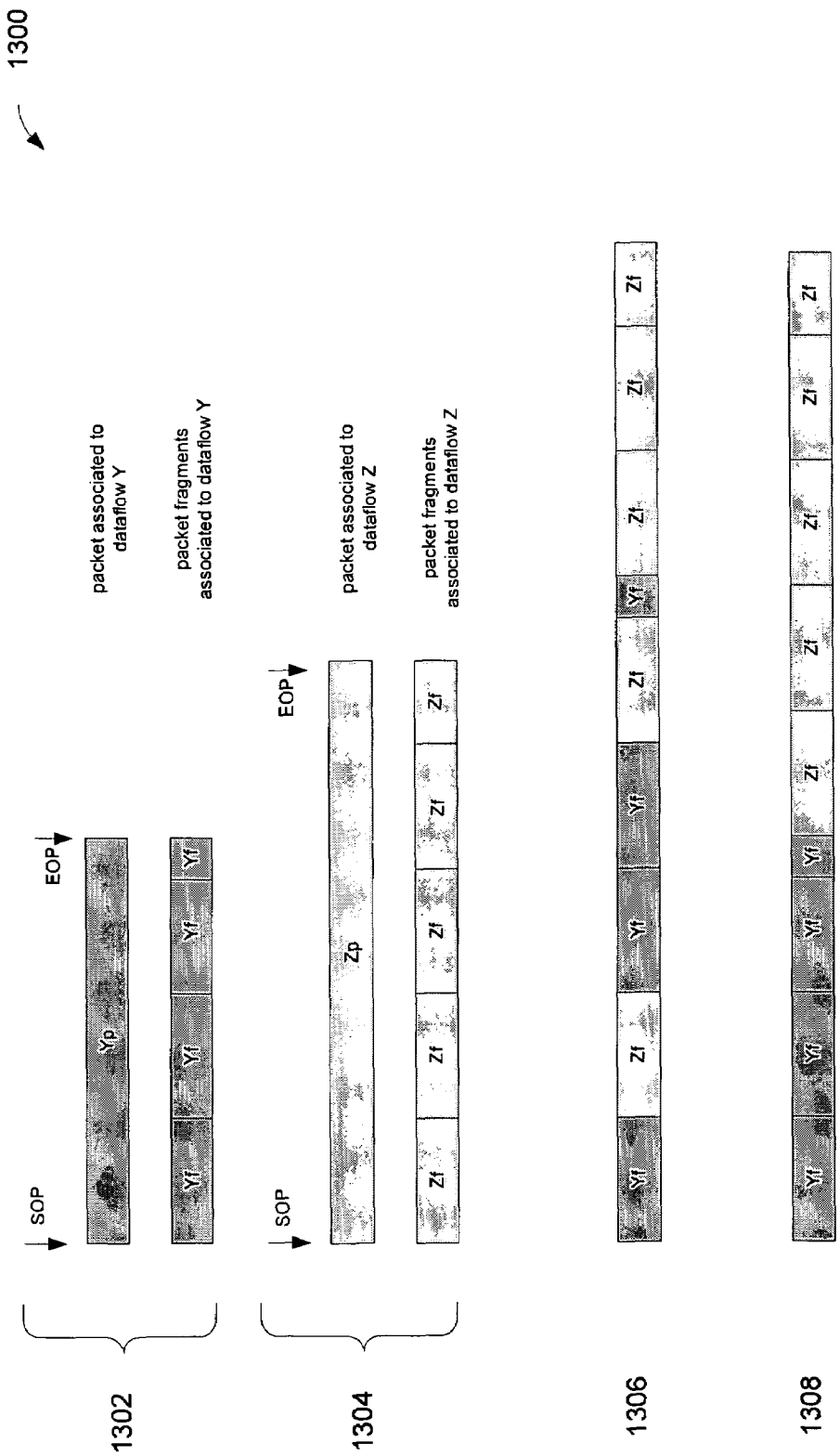
FIG. 13 illustrates one embodiment of the invention showing various data path modes.

FIG. 13 illustrates one embodiment of the invention showing various data path modes 1300. At 1302 is shown a packet associate with dataflow Y and Y packet fragments. At 1304 is shown a packet associate with dataflow Z and Z packet fragments. At 1306 is illustrated a data path in cut-through (also denoted cut-through or cut through) mode. At 1308 is illustrated a data pate in packet mode. In cut-through mode, a data path carries successive packet fragments (associated to various logical data flow) 1306. In packet mode successive packet fragments are associated with an identical logical data flow 1308. In cut-through mode, successive packet fragments may be destined to or sourced from different LIDs over the data path, and fragments of packets may be interleaved. For example 1306, fragments of packet Y may be interleaved with fragments of packet Z. In packet mode, successive packet fragments are destined to or sourced from one LID over the data path, and fragments of packets are not interleaved with the successive packet fragments. For example 1308, fragments of packet Y are not interleaved with fragments of packet Z.

Figure 14:
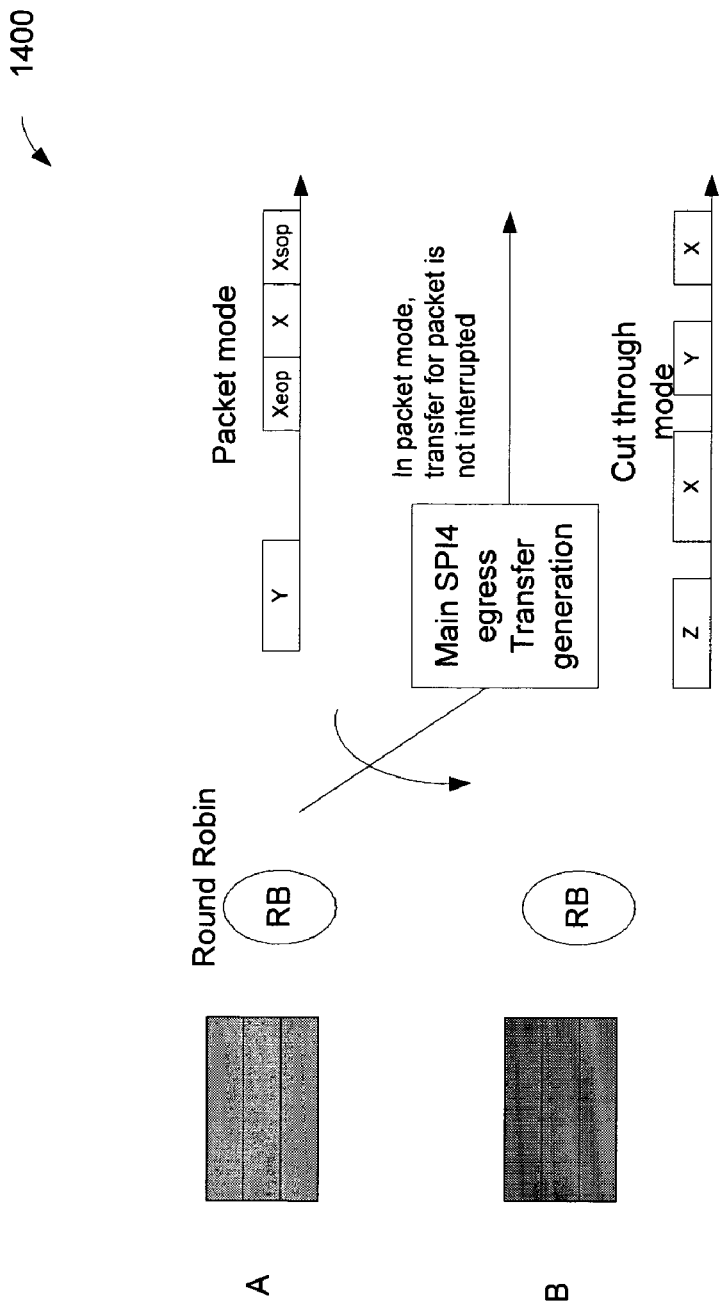
FIG. 14 illustrates one embodiment of the invention in block diagram form.

FIG. 14 illustrates one embodiment of the invention in block diagram form.

In one embodiment of the invention, both packet an cut-through mode are supported on a programmable basis in a PFP (packet fragment processor). In cut-through mode, the unit is one transfer. In packet mode, the unit is one packet. In one embodiment of the invention, the PFP can process each link in packet mode and cut-through mode. In another embodiment of the invention, the packet or cut-through mode is controllable on a per logical port basis. In one embodiment of the invention, the cut-through burst length is programmable per SPI4 interface.

In one embodiment of the present invention, support is provided for both non-overbooking mode and overbooking mode of operation. In non-overbooking mode, the maximum number of buffer segments that one LID can occupy is limited by a programmable buffer segment assignment table. Per LID overflow will happen if there is more data and the assigned segments are used up. At this point backpressure is generated.

Figure 15:
FIG. 15 illustrates one embodiment of status generation for thresholds of starving, hungry, and satisfied.

FIG. 15 illustrates one embodiment of status generation for thresholds of starving, hungry, and satisfied. These three status levels are generated based on the buffer fill level and a programmable threshold for each. Note that Status=Starving, if Free segment>starving threshold. That Status=Hungry, if Free segment>Hungry threshold and Free segment<=starving threshold. And that Status=satisfied, if Free segment<=Hungry threshold. Note, that the free segment equals the unused segment assigned for this LID.

In overbook mode the threshold for backpressure of each LID and the global buffer are configurable. In overbooking mode, both the per LID buffer and the global buffer fill level affect the status generation for backpressure. All LID's status are set to 'satisfied' if a free segment of buffer poll <=threshold as defined by a buffer management configuration register. In one embodiment "overflow" is routed to another not full buffer. The backpressure signal is then an "aggregate" signal not issued until all full is signaled or the buffer is completely out of memory. In one embodiment of the invention, when a buffer full condition is achieved backpressure is applied to all channels.

In another embodiment of the present invention, the back pressure for overbooking mode is where the "buffer full"

condition is when memory is used up to the "satisfied" threshold which is a predetermined or dynamically adjusted threshold such that free memory (other than used for a buffer) is still available for use in order to satisfy, among other things, outstanding flow control credit requests, etc.

Figure 16:
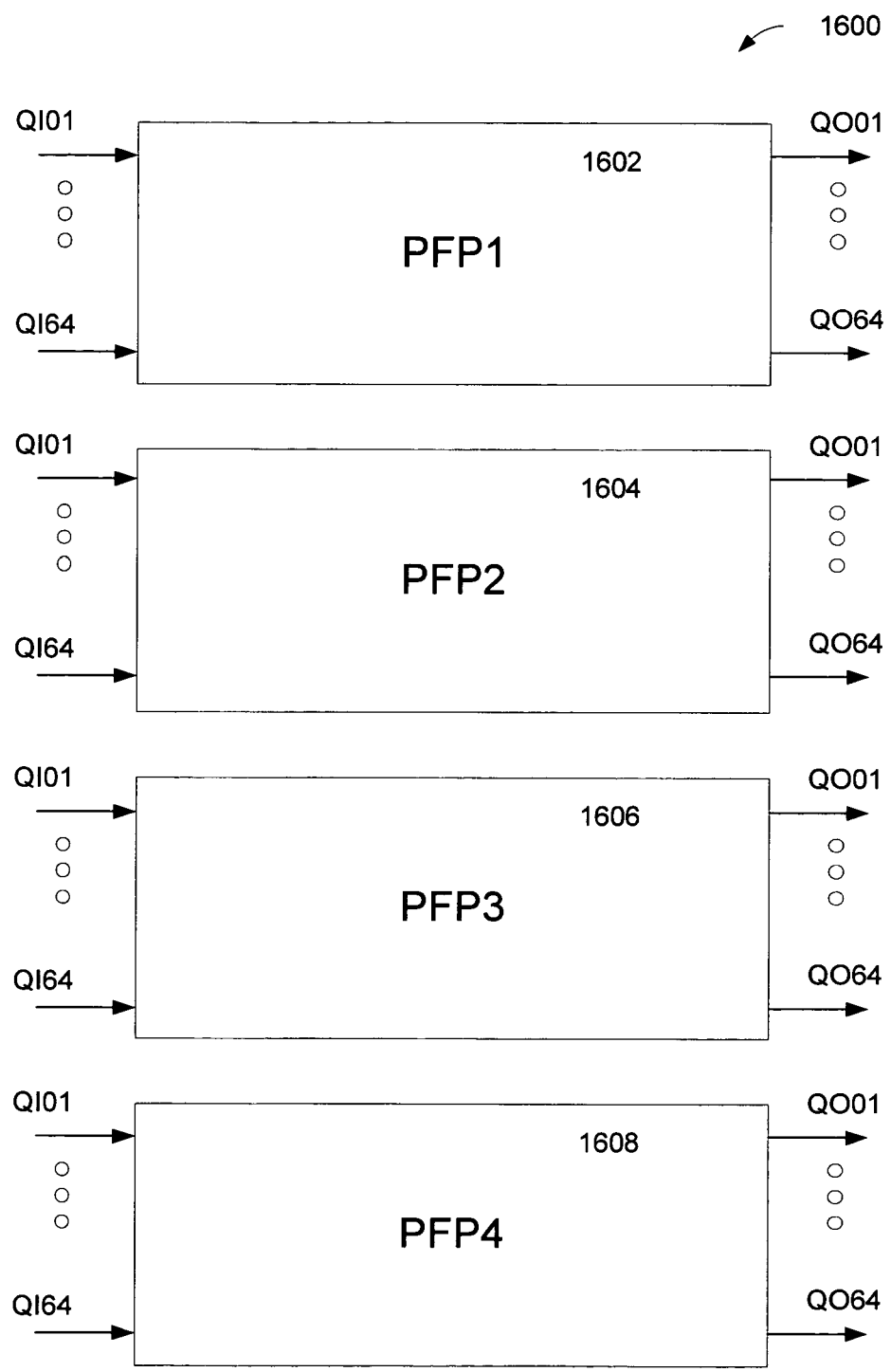
FIG. 16 illustrates in block diagram form four PFPs for queue concatenation.

In one embodiment of the present invention, queue concatenation is supported. FIG. 16 illustrates in block diagram form four PFPs (PFP1 1602, PFP2 1604, PFP3 1606, and PFP4 1608) each having 64 queue channels (a QIxx and an associated QOyy). In one embodiment the queues may be implemented as a linked list arrangement. For illustration purposes queue inputs QIxx and queue outputs QOyy are shown discretely. In queue concatenation any queue output may be routed to any queue input thus extending the queue. This may assist with asymmetrical bandwidth situations. For example, to extend the length of queue 1 for PFP1, the output QO01 may be routed to the input of queue 1 of PFP2(QI01). This connection would be denoted PFP1.QO01 to PFP2.QI01. The resulting queue would be from PFP1.QI01 to PFP2.QO01.

To extend the length another example would be PFP1.QO02 to PFP4.QI34, then PFP4.QO34 to PFP3.QI13, then PFP3QO13 to PFP1.QI47, then PFP1.QO47 to PFP2.QI21. The "resultant" queue would then be from PFP1.QI02 to PFP2.QO21. If the queue lengths within each PFP were equal then the resulting PFP1.QI02 to PFP2.QO21 queue would be 5× the length of just the PFP1.QI02 to PFP1.QI02 (i.e. queue 2 of PFP1) length.

Figure 17:
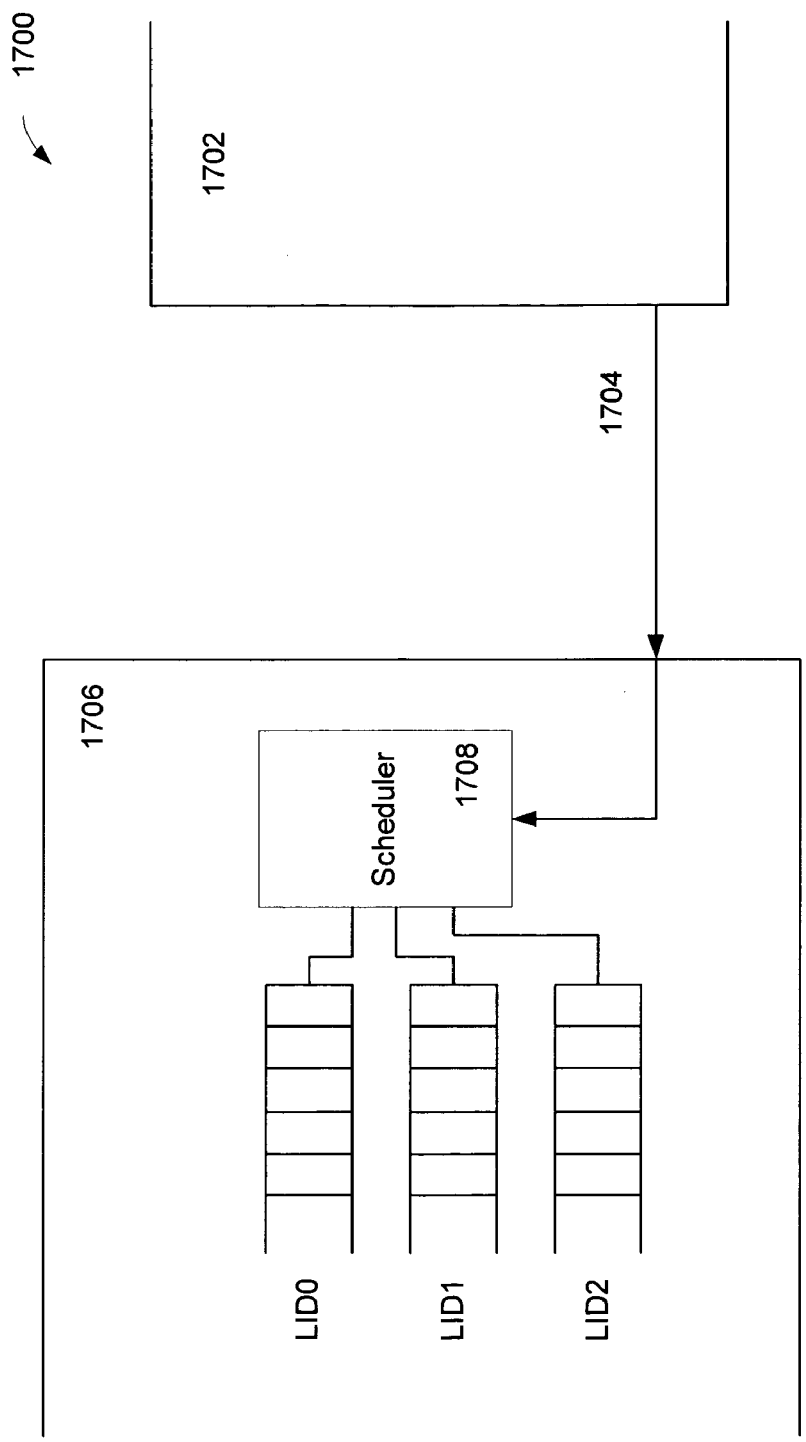
FIG. 17 illustrates one embodiment of the invention showing LID priority.

FIG. 17 illustrates one embodiment of the invention showing LID priority 1700. At 1702 is a device which sends a status, such as, hungry, starving, and satisfied per port via link 1704 to block 1706 and into a scheduler 1708 which has as inputs in this example 3 logical ports, LID0, LID1, and LID2. In another embodiment of the invention there are 64 LIDs. Each LID is given a 2 level priority for use by the scheduler. In this way, the scheduler may use a round robin for a local based priority. For example, assume that priority A is higher than priority B. Assume that LID0 has a B priority and LID1 and LID2 are each at priority A. Scheduler 1708 would then proceed to schedule LID1 and LID2 before LID0. When LID1 and LID2 are completed, then the scheduler 1708 would handle LID0.

In one embodiment of the invention, there is an egress server defined 2-level priority associated with each LID and queues with the same priority are served in round robin.

Figure 18:
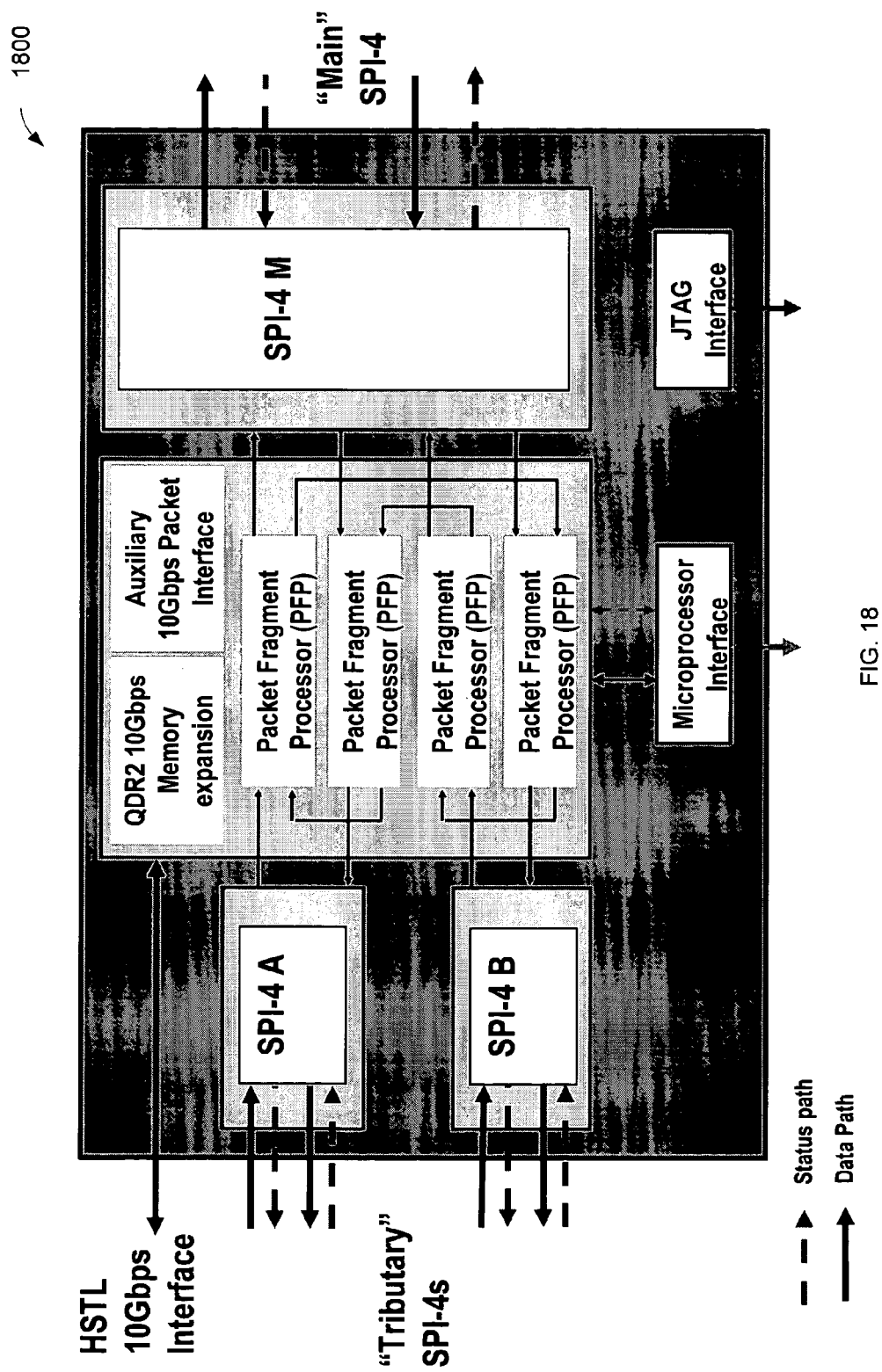
FIG. 18 illustrates one embodiment of the present invention in block diagram form.

FIG. 18 illustrates one embodiment of the present invention in block diagram form 1800.

Thus a method and apparatus for generic interface, packet cut-through, overbooking, queue concatenation, and logical identification priority for a System Packet Interface device have been described.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
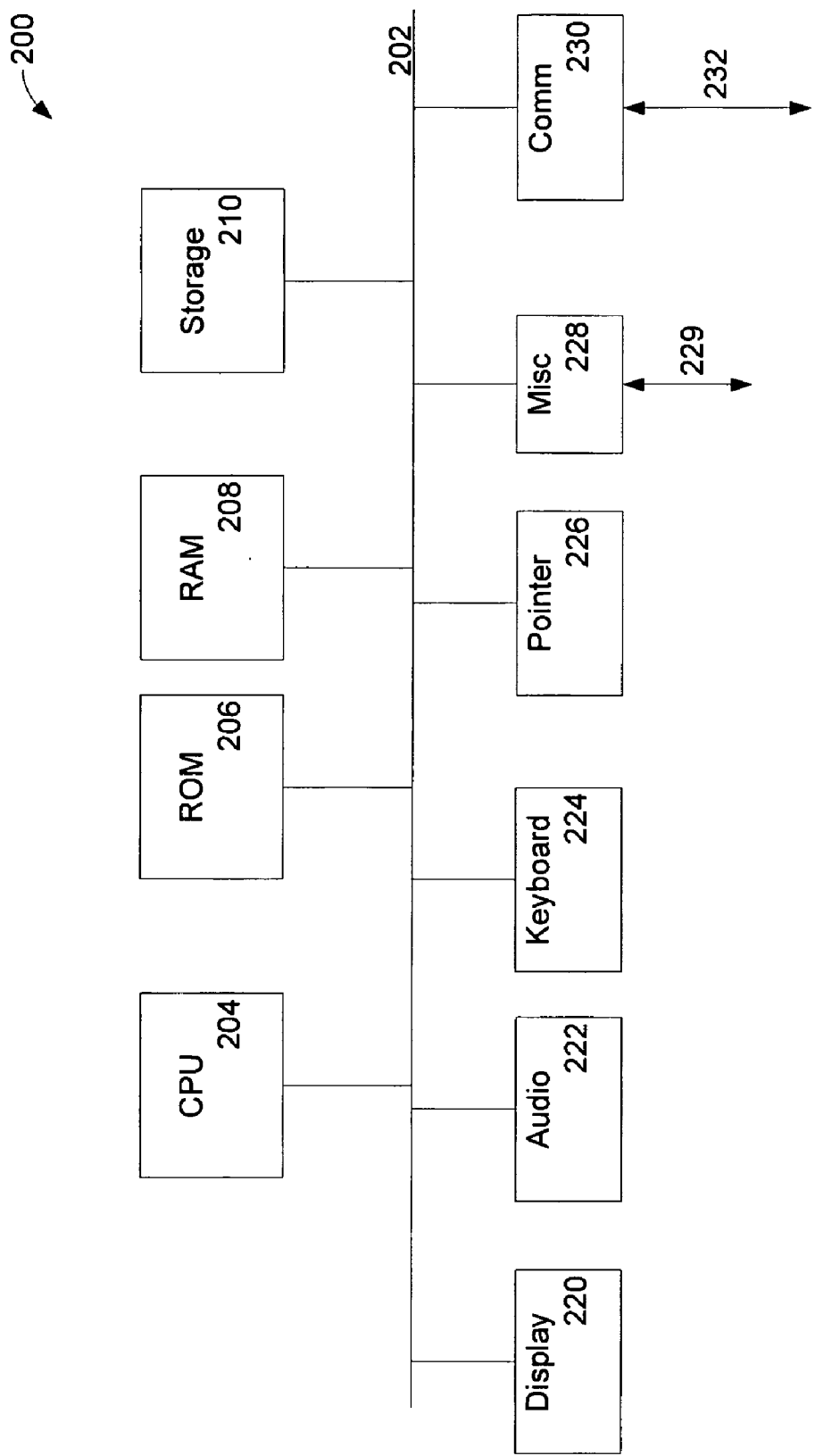
FIG. 2 is a block diagram of a computer system in which some embodiments of the invention may be used.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of visual communicating means or device whether local or remote, such as a LAN, a WAN, a system bus, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

Thus a method and apparatus for generic interface, packet cut-through, overbooking, queue concatenation, and logical identification priority for a System Packet Interface device have been described.

What is claimed is:

1. An apparatus comprising:
    a system racket interface (SPI) device having one or more interfaces for communicating data wherein said communicating data is one or more rackets of data;
    means for associating a logical identification (LID) with said communicating data from said one or more interfaces; and
    means for using said LID to provide one or more operations selected from the group consisting of packet mode, packet cut-through, overbooking, queue concatenation, LID based priority, LID based scheduling, and packet fragment processing.

2. The apparatus of claim 1 wherein said packet cut-through is per a logical port.

* * * * *